US008450895B1

(12) United States Patent
Howard

(10) Patent No.: US 8,450,895 B1
(45) Date of Patent: May 28, 2013

(54) 3-D SERVO POSITIONING SYSTEM AND METHOD

(75) Inventor: Ryan R. Howard, Seattle, WA (US)

(73) Assignee: Levitate IP, LLC, Seattle, WA (US)

( * ) Notice: Subject to any disclaimer, the term of this patent is extended or adjusted under 35 U.S.C. 154(b) by 147 days.

(21) Appl. No.: 12/774,606

(22) Filed: May 5, 2010

Related U.S. Application Data

(60) Provisional application No. 61/175,854, filed on May 6, 2009, provisional application No. 61/180,176, filed on May 21, 2009.

(51) Int. Cl.
*H02K 16/00* (2006.01)
*H01Q 3/00* (2006.01)

(52) U.S. Cl.
USPC ........ 310/80; 310/254.1; 310/261.1; 343/763

(58) Field of Classification Search
USPC ............. 310/80, 254.1, 261.1, 86 R; 74/5.22, 74/5.46, 5.7; 343/763, 757, 882
See application file for complete search history.

(56) References Cited

U.S. PATENT DOCUMENTS

| | | | |
|---|---|---|---|
| 3,854,341 A * | 12/1974 | Quermann | 74/5.7 |
| 4,983,875 A * | 1/1991 | Masaki et al. | 310/323.03 |
| 5,280,225 A * | 1/1994 | Pine et al. | 318/575 |
| 5,410,232 A * | 4/1995 | Lee | 318/568.11 |
| 5,413,010 A * | 5/1995 | Nakanishi et al. | 74/5.22 |
| 7,675,208 B2 * | 3/2010 | Bandera | 310/80 |
| 7,710,337 B2 * | 5/2010 | Blalock | 343/757 |
| 7,969,375 B2 * | 6/2011 | Blalock | 343/763 |

* cited by examiner

*Primary Examiner* — Tran Nguyen
(74) *Attorney, Agent, or Firm* — Jeffrey Parry IP; Jeffrey C. Parry

(57) ABSTRACT

A 3-D servo positioning system which may be used for positioning solar panels or other devices has a part-spherical socket member and a ball rotatably engaged in the socket member. Plural electromagnets are positioned in a predetermined pattern in the socket member, while one or more magnets are mounted in an end portion of the ball located in the socket. A shaft extends from a part of the ball outside the socket and a device to be positioned is mounted on the end of the shaft. A controller is programmed to actuate selected electromagnets based on sensor inputs so as to move the ball in the socket and adjust the angle and direction of the device attached to the shaft.

20 Claims, 13 Drawing Sheets

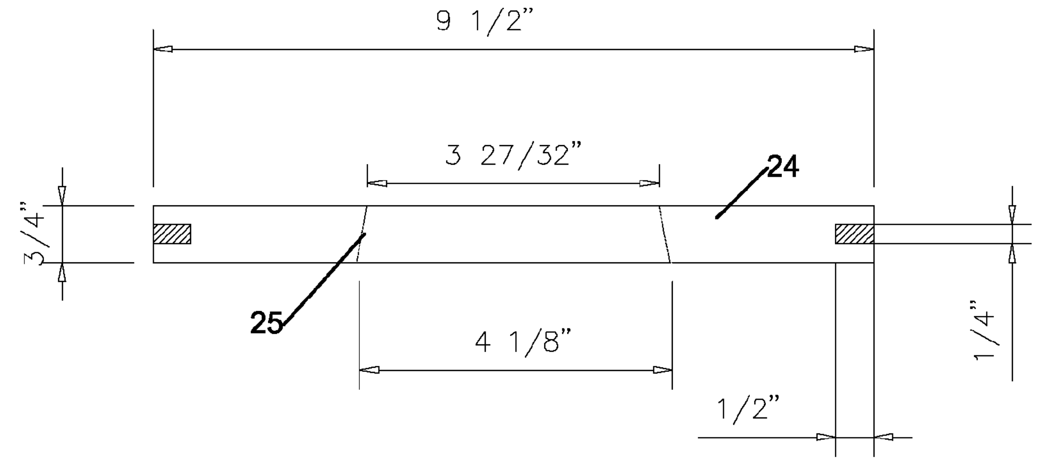
FIGURE 5A
FIGURE 5B
TOP PLATE
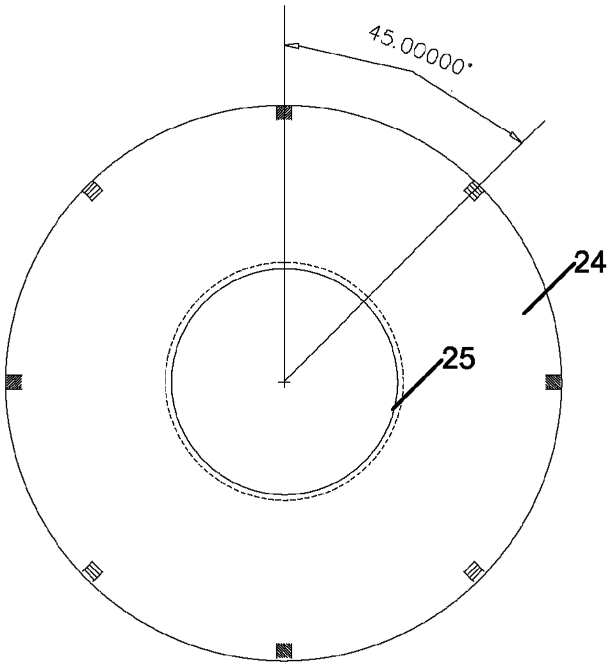

3-D SERVO POSITIONING SYSTEM AND METHOD

CROSS-REFERENCE TO RELATED APPLICATIONS

This application claims priority to U.S. provisional patent application 61/175,854 filed on May 6, 2009 and U.S. provisional patent application 61/180,176 filed on May 21, 2009 under 35 U.S.C. 119(e). U.S. provisional patent application 61/175,854 and U.S. provisional patent application 61/180,176 are hereby incorporated by reference as though set forth in full.

BACKGROUND

1. Field of the Invention

The present invention relates to servo positioning systems and is particularly concerned with a 3-D servo positioning system in which an object to be positioned can be tilted at a selected angle while being rotated to face in a desired direction, and can also be rotated about its axis.

2. Related Art

Typical servo positioning systems are two dimensional and include servo motors, gears, screw drives or the like. Such systems can be relatively expensive and inefficient. For example, when such a system is used to control positioning of a solar panel, it may not provide optimum positioning to receive sunlight over the entire panel, particularly in low angle sunlight conditions.

SUMMARY

The present invention provides a 3-D servo positioning system and method which can provide x,y and z directional positioning of an object. In one embodiment, the system is used to control positioning of a solar panel to track the sun's movement during a day, while other embodiments use the system for positioning other types of devices or for various types of signal transmission and detection in multiple directions.

In one embodiment, a 3-D servo positioning system comprises a hemispherical or part-spherical seat or socket containing an array of electromagnets, a pivot joint member having a ball at a first end which is rotatably mounted in the hemispherical seat, a shaft extending from the ball away from the socket, and a mounting device at the second end of the joint member, the ball containing a plurality of magnets facing the electromagnet array, and a controller which controls actuation of the electromagnets so as to control 3-D positioning of the mounting device. In one embodiment, a solar panel is mounted on the second end of the joint member, and light sensors on the panel have outputs which are transmitted to the controller. The controller is programmed to actuate the electromagnets so as to control the angle and direction of the panel to receive a maximum amount of sunlight, and to spin the panel about its axis either temporarily or continuously. This may help to ensure that the incoming sunlight covers the whole panel. The panel is moved to track the sun's movement while continuously spinning regardless of its orientation.

The array of electromagnets in the fixed hemispherical seat in one embodiment comprises a central electromagnet and a series of electromagnets arranged in rings of different radii about the central electromagnet. The ball at the end of the pivot joint member may have a central magnet and four magnets in a square arrangement about the central magnet. This arrangement allows the ball to be swiveled in the seat to a desired angle relative to the vertical direction and so that the shaft points in a desired direction, based on the tracking sensor input, by suitable actuation of one or more electromagnets corresponding to the desired angle and direction. At the same time, electromagnets can be actuated sequentially so as to rotate the ball about the central axis of the pivot joint member, and thus to rotate the panel at the opposite end of the member.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 5A is a cross-sectional view of the top plate of FIG. 1;

FIG. 5B is a top plan view of the top plate of FIG. 1;

DETAILED DESCRIPTION

Certain embodiments as disclosed herein provide for a three dimensional servo positioning or tracking system. In one embodiment, the system is used for positioning of solar panels to follow movement of the sun. In other embodiments, the system may be used for positioning other types of devices, for example pan and tilt camera units, military weapons guidance/targeting, transmitter/detector devices for radar, sonar or other signals that need to detect and transmit signals in multiple directions, control of tool and workpiece positions in factories for line control, CNC machining, molding, car assembly, medical (e.g., prosthetic limbs, remote operation (s)), factory robots, and in general robotics (both commercial and hobby). There are also many possible applications of the 3-D servo positioning system in space, such as remote booms, lunar and planet roaming devices, telescope lens apertures and positioning, satellite control, and control of solar panels, antennas, cameras and transmitters on satellites as well as satellite tracking.

After reading this description, it will become apparent to one skilled in the art how to implement the invention in various alternative embodiments and alternative applications. However, although various embodiments of the present invention will be described herein, it is understood that these embodiments are presented by way of example only and not limitation. As such, this detailed description of various alternative embodiments should not be construed to limit the scope or breadth of the present invention.

Figure 1:
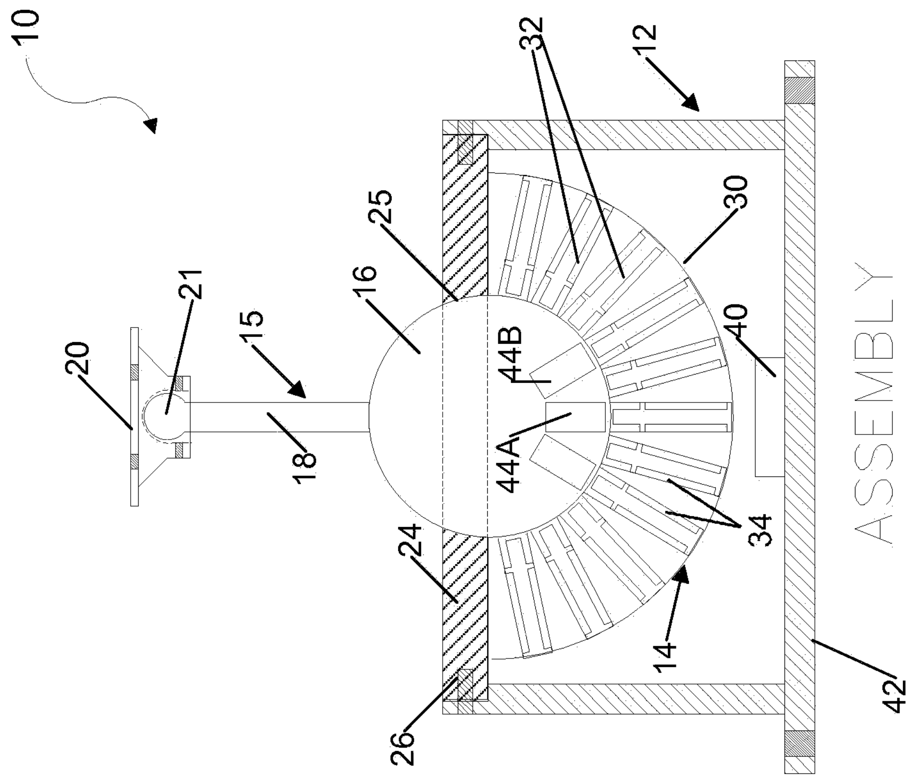
FIG. 1 is a vertical cross sectional view of a first embodiment of a 3-D servo positioning assembly.
Figure 9:
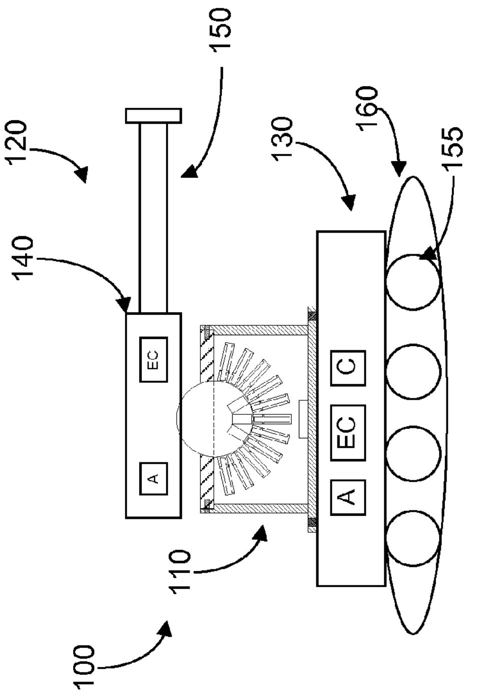
FIG. 9 is a front elevational view of an embodiment of a tank including an embodiment of an absolute relative positioning system for target acquisition.

FIG. 1 illustrates an embodiment of a 3-D servo positioning system or assembly 10 which comprises an outer case or housing 12 which is open at one end, a hemispherical socket or seat 14 mounted adjacent one open end of the housing, and a pivot joint member or rotor 15 having a ball 16 at one end which is in swivel engagement in socket 14. Socket 14 need not be hemispherical and may be of other part-spherical shapes in alternative embodiments. Joint member 15 has a shaft or stem 18 which projects away from the socket and a mounting plate 20 is secured to an enlarged end portion 21 of stem 18. An item to be positioned, such as a solar panel 22 as indicated in FIG. 9, may be secured to mounting plate 20. A top plate 24 is secured over the open end of housing 12 and has a central opening 25 aligned with the socket, through which an outer portion of the ball 16 and the stem 18 project. As seen in FIG. 1, the opening 25 is of part spherical shape forming a continuation of the shape of socket 14, so that the ball 16 extending through the socket can be rotated smoothly to any desired angle. Top plate 24 is illustrated in more detail in FIGS. 5A and 5B, and is secured in the open end of casing 12 via spaced fasteners 26 extending through aligned openings in the casing wall and the outer perimeter of plate 24.

Figure 7:
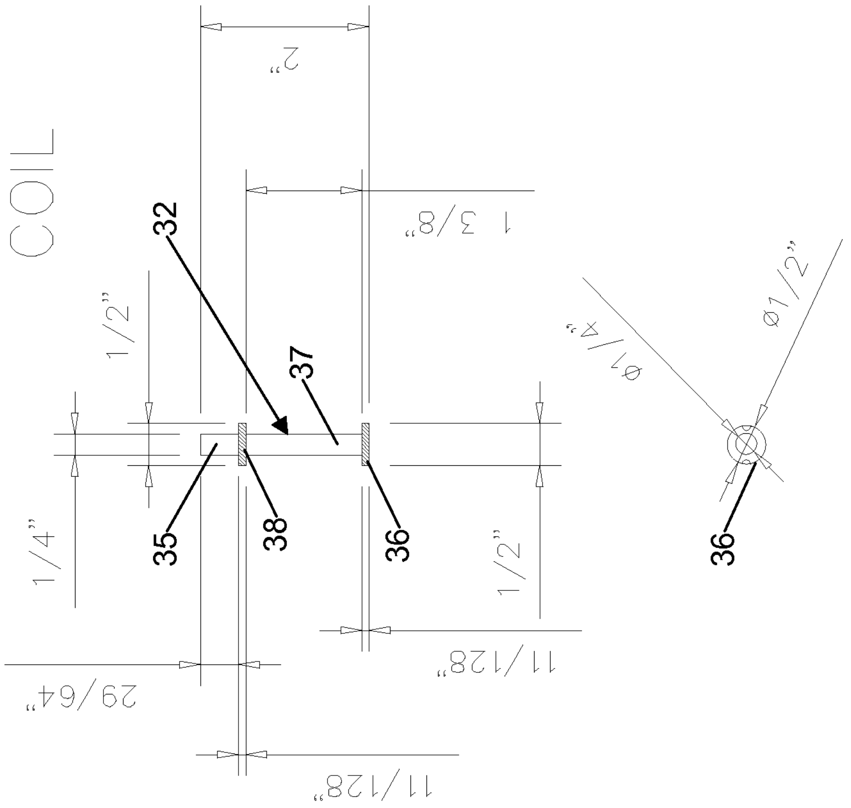
FIG. 7 is a side elevation view of one of the electromagnets in the seat of FIG. 1.

As best illustrated in FIGS. 1, 2A, 2B, and 7, the hemispherical seat 14 comprises a hemispherical member of a suitable non-ferrous material such as Teflon® or Teflon® coated material having an inner surface 28 and an outer surface 30, and an array of electromagnets 32 each extending from the inner to the outer surface of the hemispherical member. Other non-ferrous materials including ceramics and metals may be used for the seat in alternative embodiments. A series of through bores 34 are provided in the desired arrangement between the inner and outer face of the hemispherical member, with an inner portion of each bore being of reduced diameter and threaded, and a respective electromagnet 32 is inserted through each bore, with a threaded end portion 35 of the electromagnet threadably engaged with the inner portion of the bore. The bores may terminate short of the inner surface 28. As illustrated in FIG. 7, each electromagnet has an outer cap 36 which engages in an outer end of the respective through bore 34 and a shoulder 38 adjacent threaded end portion 35, and the coil is wound on the portion 37 between the shoulder 38 and cap 36. Suitable wiring (not illustrated) is provided between each electromagnet and a control circuit on circuit board 40 mounted on the base wall 42 of casing 12. Electromagnetic shielding such as a conductive nickel coating may be provided on the electronic components to reduce or eliminate EMI/RFI interference (both inbound and outbound).

Figure 2A:
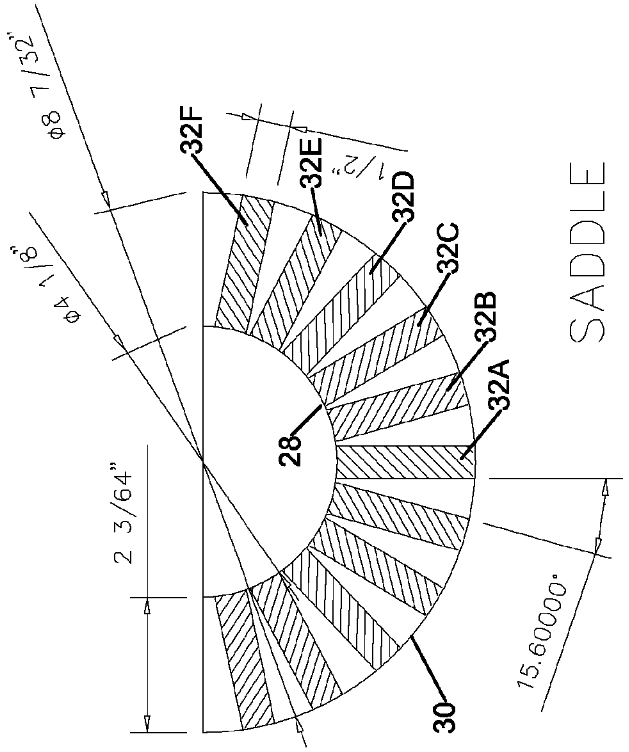
FIG. 2A is a vertical cross-sectional view of the seat or socket member of FIG. 1.
Figure 2B:
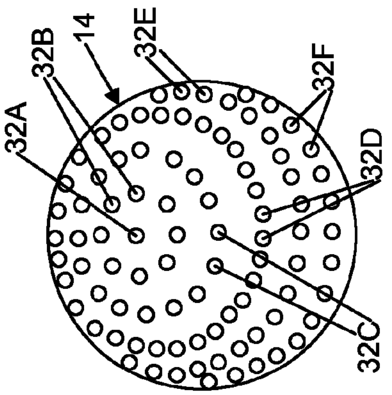
FIG. 2B is a perspective view of the seat of FIG. 2A, illustrating the electromagnet positions in the seat.

The arrangement of the electromagnets is designed to permit precise three dimensional positioning of ball 16 and thus of an object secured to the mounting plate 20 of the pivot joint member. In one embodiment, a central electromagnet 32A is located at the center of hemispherical seat 14, with the remaining electromagnets arranged in five circular patterns of gradually increasing diameter about the central electromagnet 32A, as illustrated in FIGS. 2A and 2B, with a first circle of electromagnets 32B, a second circle of electromagnets 32C, a third circle of electromagnets 32D, a fourth circle of electromagnets 32E, and a fifth circle of electromagnets 32F. In the illustrated embodiment, electromagnets 32 are provided at a ½ inch spacing over the surface of the hemispherical seat member 14, but a greater or lesser number of electromagnets at different spacings may be provided in alternative embodiments, and the dimensions of the socket itself may be different in other embodiments, depending on the amount of movement required.

Figure 3A:
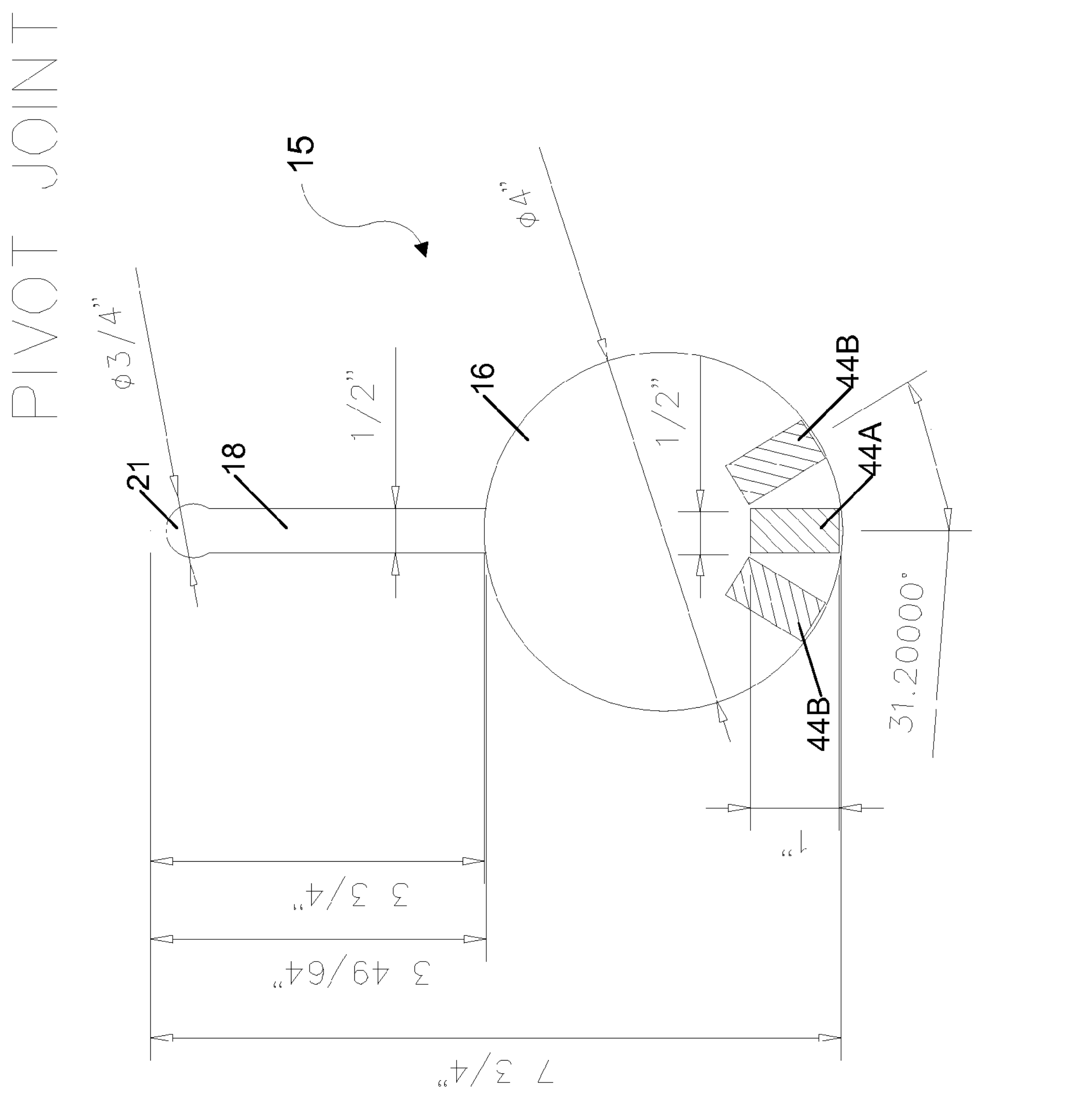
FIG. 3A is vertical cross-sectional view of the pivot joint member of FIG. 1.
Figure 3B:
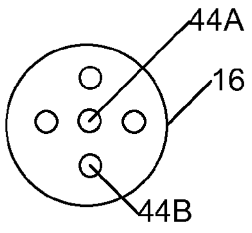
FIG. 3B is a bottom plan view of the ball of the pivot joint member which engages in the seat of FIGS. 1 and 2.
Figure 3C:
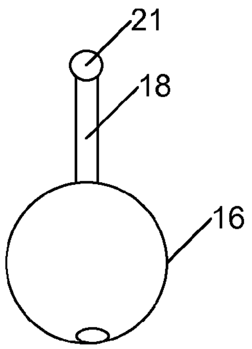
FIG. 3C is a side elevation view of the ball of FIG. 3B.
Figure 3D:
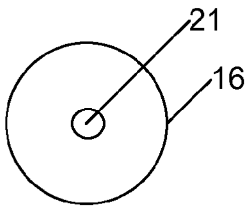
FIG. 3D is a top plan view of the ball of FIG. 3B.

The pivot joint member 15 is illustrated in more detail in FIGS. 3A to 3D, and may be of any suitable non-ferrous material such as ceramic, plastic, Teflon®, Teflon® coated material, or the like. A plurality of permanent magnets 44 are embedded in an end face of the ball 16 with outer ends facing the socket. In the illustrated embodiment, a total of five magnets are provided, with a first magnet 44A at the center of the end face and four additional magnets 44B arranged in a square pattern around magnet 44A, as best illustrated in FIG. 3B. In one embodiment, the magnets may have oppositely directed poles to assist in positioning and rotation, as described below. For example, the four magnets 44B may be of alternating polarity at their outer ends, or they may be of the same polarity at their outer ends while the center magnet 44A is of opposite polarity at its outer end. Other magnet arrangements with fewer or more permanent magnets may be used in alternative embodiments, depending on the required resolution, strength, torque and hold force when charged and inactive for the particular application. The use of opposite poles helps to drive rotation and keeps the permanent magnets attracted to the ferrous material of the electromagnets when the power is not on, holding the ball in the same position.

The ball is rotated in socket 14 by actuation of electromagnets 32 so as to position an object attached to mounting plate 20 at a desired angle and direction. The angle and direction of the pivot joint member or rotor 15 is controlled by actuating at least one angle electromagnet which is located at the appropriate position and angle so as to attract the center pole or permanent magnet 44A on the ball. At the same time, all of the other electromagnets may be fired polarized in a push/pull configuration in reference to their corresponding permanent magnets on the ball 16. For example, if the pivot joint member is to be tilted to the left as viewed in FIG. 1, an appropriate angle electromagnet on the right hand side of the socket is actuated so as to attract the center pole 44A at the lower end of the 16 towards the right, thereby pivoting stem or shaft 18 to the left. If appropriate, additional force can be applied by utilizing other permanent magnets and other electromagnets in the electromagnet array. When the rotor is in position, temporary or permanent rotation can be accomplished by changing the polarity of the corresponding electromagnets to the upper four permanent magnets 44B, while the center magnet 44A is used as rotational pivot with the opposing electromagnet maintained at the appropriate polarity to continuously attract center magnet 44A. In one embodiment, if desired, the rotor may be arranged to stay fixed in position even without power applied to the unit, by using the natural ferrous material attraction to the permanent magnets.

Figure 4A:
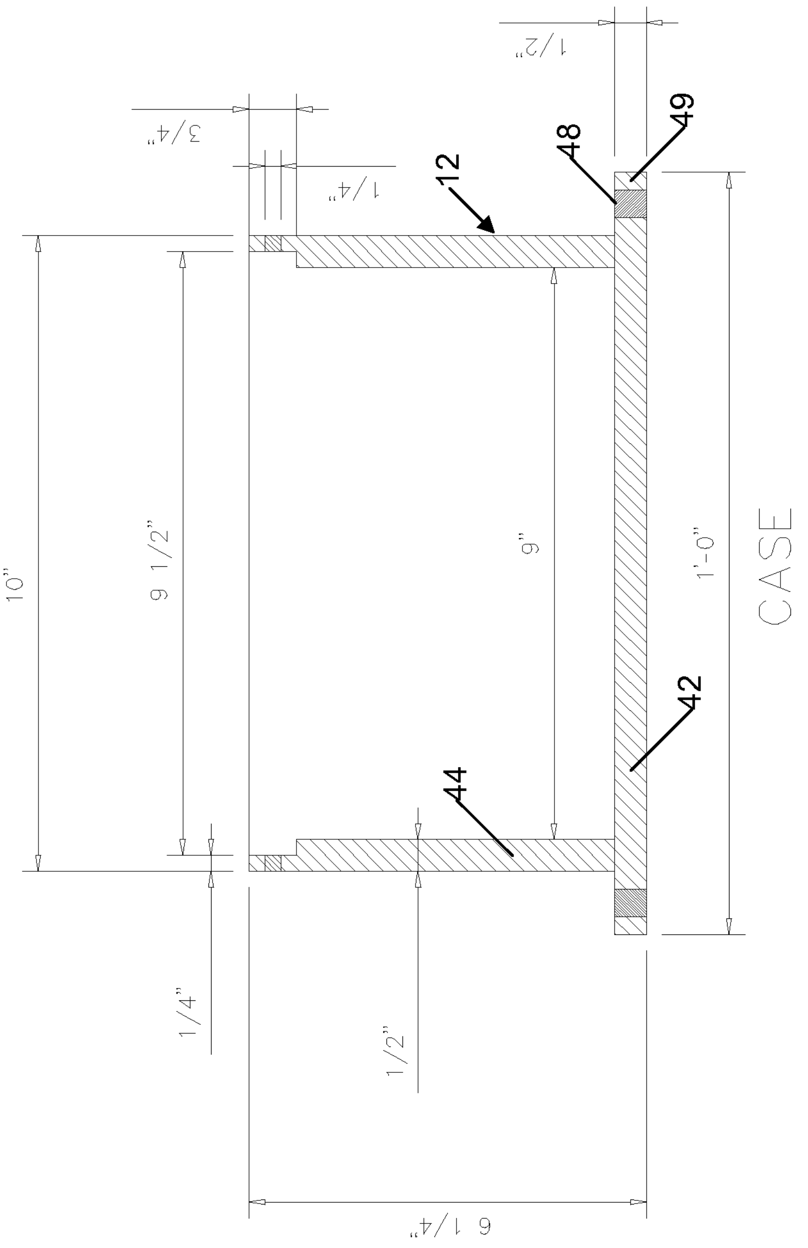
FIG. 4A is a cross-sectional view of the case of FIG. 1.
Figure 4B:
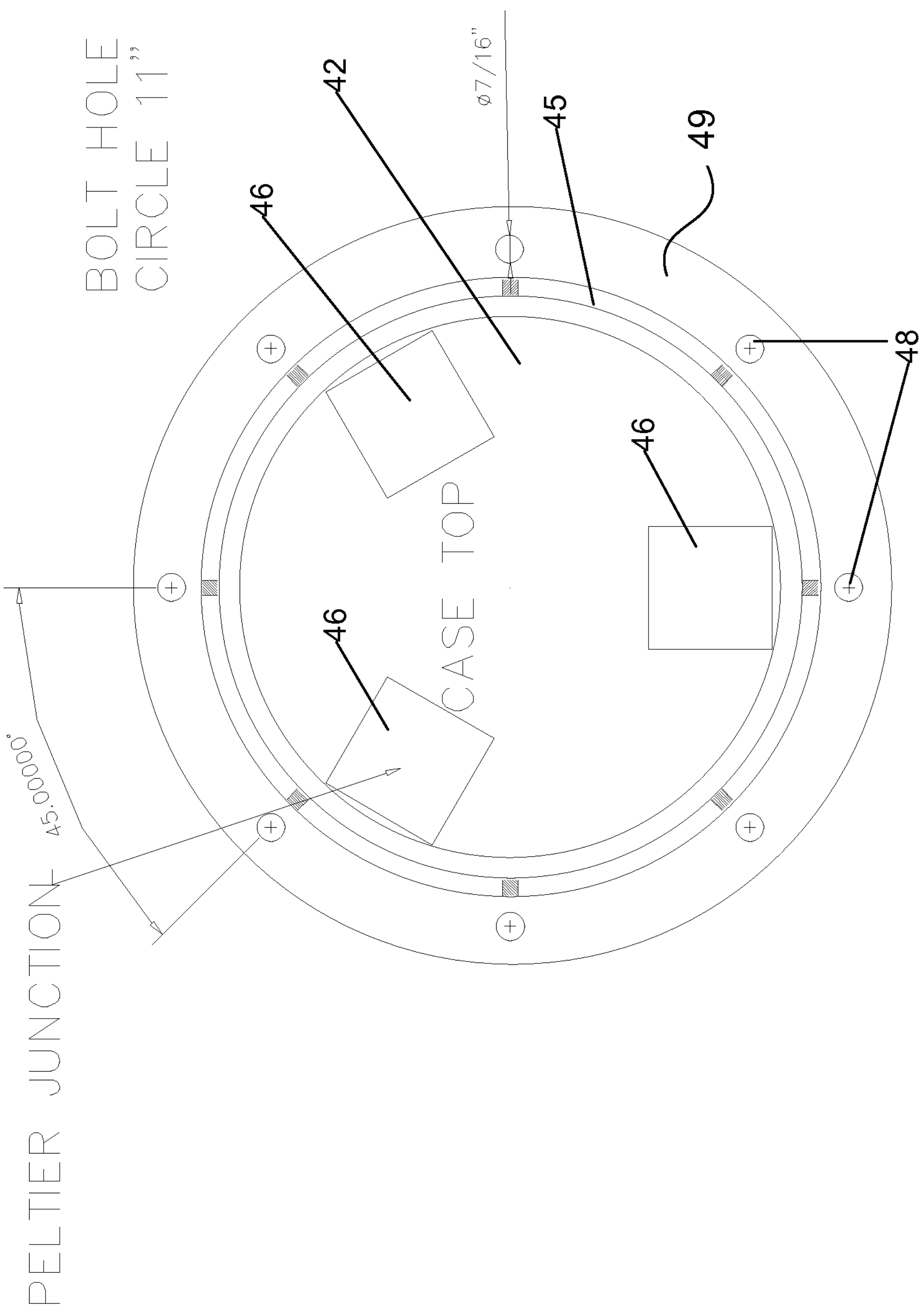
FIG. 4B is a top plan view of the case of FIG. 4A.

The case or housing 12 is illustrated separate from the assembly in FIGS. 4A and 4B and comprises a lower or base wall 42 and a cylindrical wall 45 projecting from base wall 42 and enclosing the socket 14. A series of bolt holes 48 may be provided on the outer rim 49 of base wall 42 to allow mounting of the housing at an appropriate location. Housing 12 may be of any suitable non-ferrous material.

As illustrated in FIG. 4B, a series of Peltier junctions 46 may be mounted on base wall 42 so as to provide solid state temperature control to the housing and enclosed components. The Peltier junctions are used in conjunction with one or more temperature sensors (not illustrated) which sense outside temperature. If the outside temperature rises above a predetermined value, the Peltier junctions are run so as to cool the housing, so that electronic components do not overheat. If the outside temperature becomes too low, the Peltier junctions may be run in the opposite direction to heat the housing. Where the assembly is used to position a solar panel, for example, a small amount of the electricity generated by the panel may be used to run the Peltier junctions. The temperature control arrangement allows the system to be used in very hot or very cold environments, such as desert environments, Arctic environments, and the like.

Figure 6B:
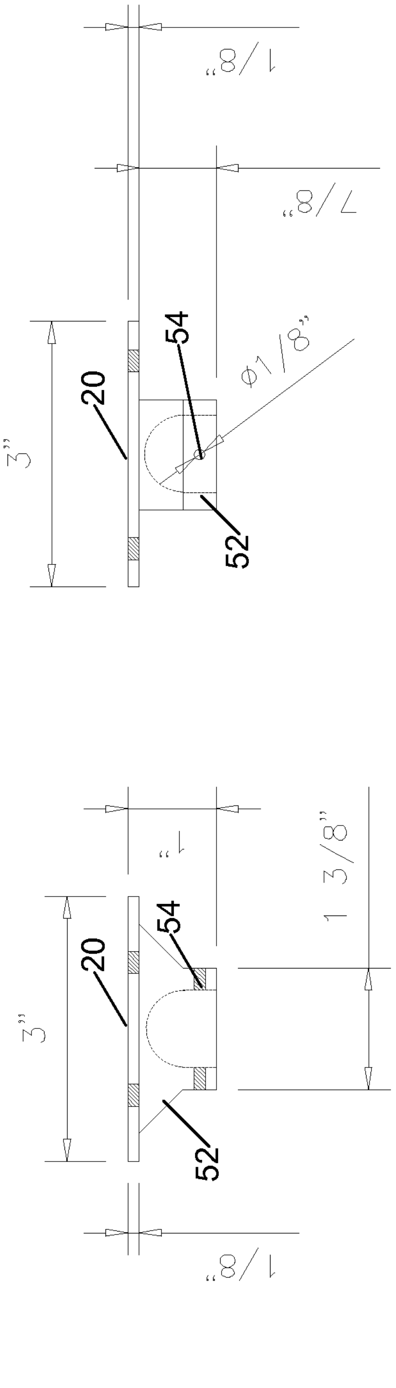
FIG. 6B illustrates side and end elevation views of the top mounting plate of FIG. 6A.
Figure 6A:
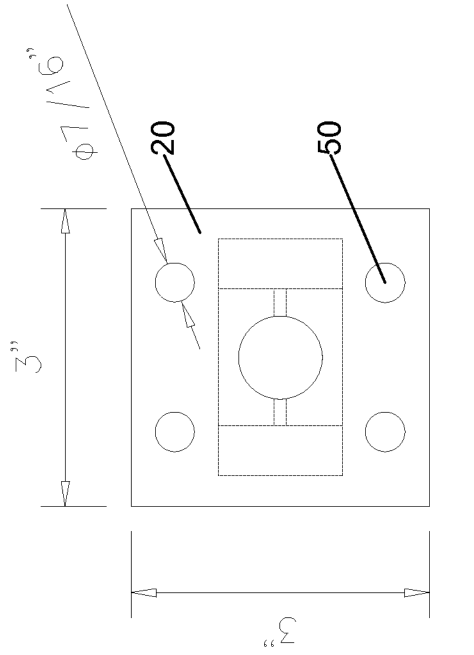
FIG. 6A is a top plan view of the top mounting plate of the swivel joint of FIG. 1.
Figure 6C:
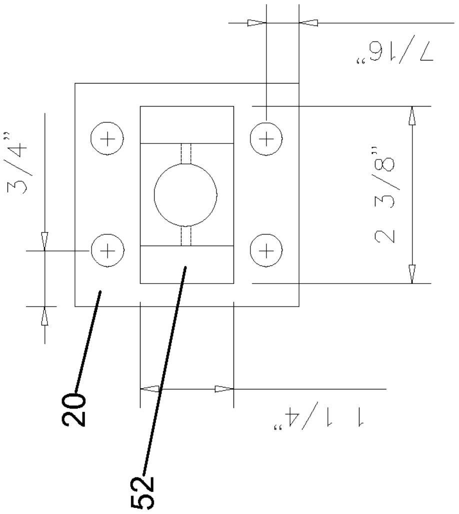
FIG. 6C is a bottom plan view of the top mounting plate of FIGS. 6A and 6B.
Figure 8:
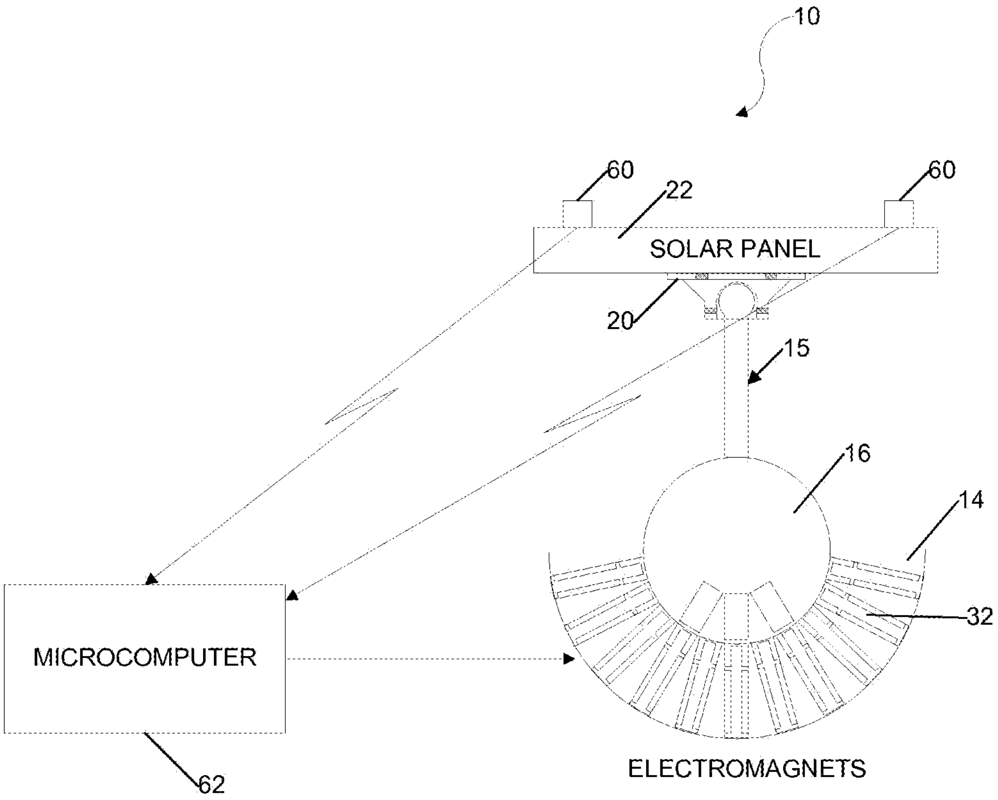
FIG. 8 is a block diagram of the servo control system which controls actuation of the electromagnets to position a device attached to the mounting plate of the swivel joint member of FIG. 1.

The mounting plate or device 20 at the end of the pivot joint member 15 is illustrated in more detail in FIGS. 6A to 6C. As illustrated, the plate 20 has a series of mounting holes 50 for attaching an item to be positioned, such as a solar panel 22 (FIG. 8). A socket member 52 on the lower side of plate 20 is fastened to the end portion 21 of stem 18, and threaded openings 54 at the lower end of socket member 52 receive suitable fastener pins to secure the end portion 21 in the socket member 52. Different mounting devices may be provided in other embodiments for attaching different items to the stem 18 for positioning purposes.

One application of the 3-D servo positioning system of FIGS. 1 to 7 is in positioning a solar panel and moving the solar panel to track movement of the sun throughout the day, as illustrated in FIG. 8. However, there are many other possible applications of the system 10 and it may be used in any application where precise positioning of an object is required, with suitable control of the electromagnet actuation dependent on the desired object position. Other possible applications include satellite positioning, satellite tracking, other aerospace applications, camera positioning, weapons guidance, industrial control applications, robotics, and the like. In a solar panel positioning system as illustrated in FIG. 8, a solar panel 22 mounted on mounting plate 20 incorporates a number of light sensors 60 for tracking the sun. In one embodiment, four light sensors are provided at the corners of panel 22. Each light sensor 60 is in wireless or wired communication with an onboard microcomputer or microprocessor 62. Microprocessor 62 is mounted on circuit board 40 in housing 12 in the illustrated embodiment. The onboard microprocessor may be a basic or PIC microprocessor which controls input and output via an optically isolated bus and controls a suitable driver array for fast positioning of the solar panel. The onboard microprocessor may have a magnetically compensated/isolated digital compass such as a Hitachi HMB or the like, as well as a global positioning system (GPS) chip and accelerometer such as a Mesmic tri axis unit or the like. These devices collectively may be used for directional and location/altitude/velocity sensing and reference points. Hall effect sensors and induction sensors may also be used to determine absolute positioning of the unit, in addition to laser positioning as secondary verification. Hall effect sensors may be used to provide positioning and magnetic field status to the microprocessor 62 for control over an insulated-gate bipolar transistor (IGBT) or a metal-oxide-semiconductor field-effect transistor (MosFET) array.

The control circuit on circuit board 40 may also include an onboard rectifier with high voltage capable Mylar caps., PWM chips, photo-coupled integrated regulators, and the like. Sensors may be incorporated in the housing for receiving environmental data, and connected to the microprocessor for controlling the Peltier junctions, for example. In one embodiment, the system also includes a reporting engine which collects data from the various sensors and panel positioning information over time and provides collected data to a remote station using Wi-Fi, Bluetooth, Zigbee, or cellular modems. The electronics are all encapsulated in black epoxy potting compound.

The microcomputer is suitably programmed to actuate the electromagnets 32 so as to move the ball 16 in a desired manner based on the light input received by sensors 60. Any type of light sensors may be used, but in one embodiment the sensors 60 are active iris sensors which can be adjusted based on detected light level. An active iris sensor is a photo sensor on a chip which has a digital iris which can be adjusted based on light conditions. In low light conditions, the iris of such a sensor opens so that the system can be operated even when the light level is low.

The microcomputer is programmed using a fuzzy logic looping system to move the solar panel to find the highest light source direction without getting into loop. This is used to optimize the angle and direction of the panel 22. The panel is moved by actuating selected electromagnets to attract the magnets in ball 15, causing the ball to move or pivot in socket 14. Pivoting of ball 15 in turn tilts and rotes the shaft 16 and anything attached to the end of shaft 16. Once the panel faces in a current direction of maximum light intensity, the microcomputer actuates electromagnets in sequence so as to spin the panel about its axis. This means that the entire panel receives sunlight even if only a small area is illuminated at any one time, for example under low light conditions or if part of the panel is in shadow in a particular orientation, so that more power is produced. The ability to rotate the panel about its central axis either temporarily or continuously while it is also moved to adjust its angle and directional orientation provides the potential for improved positioning and operation in various areas, including signal tracking and acquisition, solar power systems, satellite positioning, and the like. For example, in a solar panel positioning application, spinning the panel can result in covering more of the solar panel with sunlight, thereby producing more power, particularly when the sun is low. As the sun moves throughout the day, the microcontroller detects the reduced signal output from the solar sensors and adjusts the panel angle and direction so as to track the sun's movement, while spinning the panel to illuminate all areas of the panel in turn when only part of the panel is illuminated.

In one embodiment, the microprocessor is programmed to compensate for any field drift relative to the position of the pivot member or rotor 15. Various devices may be used to determine the current rotor position, such as a dissimilar pole magnet, RF ID, reflective lens, or the like.

In the above system, there is only one moving component, gears and screw drives common in known servo systems are eliminated, and the system is inexpensive and efficient. There are no exposed electronic components, and the housing is designed to exclude dust and moisture. The incorporation of Peltier junctions to accommodate wide temperature differentials allows the system to be used in hot and cold climates.

Use of the 3-D servo system to position a solar panel is described above in connection with FIG. 8. However, there are many other possible applications of such a system, and it may be used anywhere where a servo is required. Some possible uses include pan and tilt camera units; military weapons guidance (e.g. a laser or machine gun mounted to the servo system described above provides a very fast targeting system); signal detection and transmission devices for radar, sonar, or the like which require the ability the detect and transmit in multiple directions; industrial control applications such as factory/line control, machining CNC, plastic molding, injection molding, car assembly lines, factory robots and the like; general robotics (both commercial and hobby); and space applications such as remote booms, lunar and planetary roaming devices, telescope lens apertures and positioning, satellite controls, on-board solar, antennas, cameras, and transmitters for satellites and other space vehicles.

Certain embodiments as disclosed herein provide for a three dimensional servo positioning or tracking system. In one embodiment, the system is used for positioning of solar panels to follow movement of the sun. In other embodiments, the system may be used for positioning other types of devices, for example pan and tilt camera units, military weapons guidance, transmitter/detector devices for radar, sonar or other signals that need to detect and transmit signals in multiple directions, control of tool and workpiece positions in factories for line control, CNC machining, molding, car assembly, factory robots, and in general robotics (both commercial and hobby). There are also many possible applications of the 3-D servo positioning system in space, such as remote booms, lunar and planet roaming devices, telescope lens apertures and positioning, satellite control, and control of solar panels, antennas, cameras and transmitters on satellites as well as satellite tracking.

Figure 10:
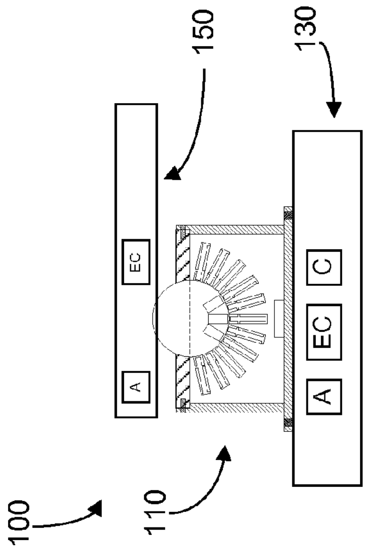
FIG. 10 is a front elevational view of a generic embodiment of a moving object (e.g., fighter plane/jet, fighter helicopter, fighter boat/ship, military combat serviceman) including an embodiment of an absolute relative positioning system for target acquisition.
Figure 11:
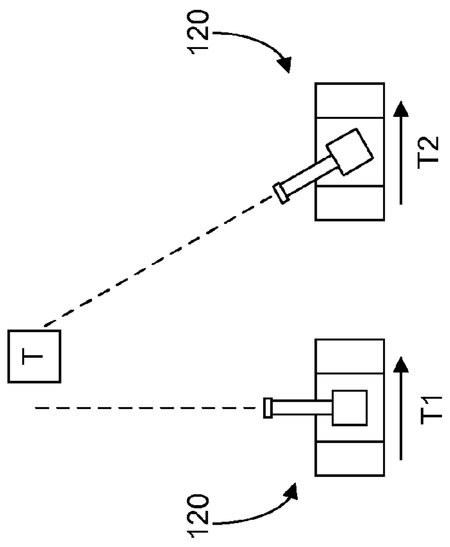
FIG. 11 is a simplified top plan view of the tank illustrated in FIG. 9 in an exemplary method of using the absolute relative positioning system for target acquisition.

With reference to FIGS. 9-11, an embodiment of an absolute relative positioning system 100 using a three dimensional servo positioning or tracking system 110, which is similar to the three dimensional servo positioning 10 shown in FIGS. 1-8 and described above, which is incorporated herein, may be used for target acquisition. FIG. 9 illustrates an embodiment of a tank 120 using the absolute relative positioning system 100 for target acquisition. The tank 120 includes a base 130 with the three dimensional servo positioning system 110 for three dimensionally positioning a turret 140 and cannon 150 in a manner generally similar to that described above for the solar panel 22. The base 130 of the tank 120 includes wheels 150 that drive track shoe 160 to move the tank in, for example, the direction of the arrows shown in FIG. 11.

Although the absolute relative positioning system 100 for target acquisition will be generally described herein with respect to the tank 120, in alternative applications/embodiments, the absolute relative positioning system 100 may be applied to other moving objects (e.g., fighter planes/jets, fighter helicopters, fighter boats/ships, military combat servicemen) where target acquisition is important.

The absolute relative positioning system 100 generally includes a moving base 130 (e.g., base/main body 130 of tank 120, body of fighter jet, helicopter body, ship body/hull, body of military combat servicemen) with at least an accelerometer A and an electronic compass EC. The absolute relative positioning system 100 also includes a movable target directing mechanism (e.g., cannon 150/turret 140, gun, laser) 150 that is movably coupled to the base 130 via the three dimensional servo positioning system 110. The movable target directing mechanism 150 is moved by the three dimensional servo positioning system 110 relative to the base 130 to be directed at a target T. The movable target directing mechanism 150 includes at least an accelerometer A and an electronic compass EC. One or more of the movable target directing mechanism 150, the three dimensional servo positioning system 110, and the base 130 include one or more computers C for controlling the three dimensional servo positioning system 110 to move and direct the movable target directing mechanism 150 for target acquisition as described herein.

With reference to FIG. 11, as the tank 120 (or other moving object) moves in the direction of the arrow, at a time T1, the tank 120 fires at a target T. The one or more computers C collect information at time T1 from accelerometers A and electronic compasses EC of the base 130 and the movable target directing mechanism 150, which moves relative to the base 130 via the three dimensional servo positioning system 110, and may determine position/coordinates of an acquisition/target point. As the tank 120 (or other moving object) continues to move in the direction of the arrow, for example, at a time T2, the one or more computers C, based on information obtained from accelerometers A and electronic compasses EC of the base 130 and the movable target directing mechanism 150, direct the three dimensional servo positioning system 110 to move the target directing mechanism 150 to point to the position/coordinates of the prior acquisition/target point based on the relative position information obtained/determined on the moving base 130 and the target directing mechanism 150. The one or more computers C may acquire signals from the accelerometers A and electronic compasses EC continuously or substantially continuously.

Thus, based on the target coordinates of where the cannon 150 of the tank 120 fired last, even as the tank 120 moves, the cannon 150 may be re-directed via the three dimensional servo positioning system 110 to the same prior target coordinates. If the original target coordinates were off from the target (i.e., tank 120 missed target), the cannon 150 position may be adjusted (i.e., re-targeted) to attempt to hit the target.

Although the base 130 has been described as including the accelerometer A and the electronic compasses EC, alternatively, the three dimensional servo positioning system 110 may include one or both of these components. In a further embodiment, a GPS satellite tracking system may be incorporated into one or more of the base 130, three dimensional servo positioning system 110, and/or target directing mechanism 150 in addition to or instead of the electronic compass EC.

Figure 12:
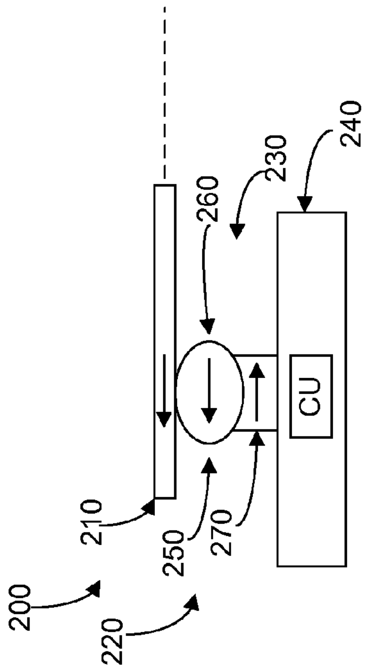
FIG. 12 is a front elevational view of a generic embodiment of a recoil absorbing system of a shooting device.

With reference to FIG. 12, an embodiment of a recoil absorbing system 200 will be described. The recoil absorbing system 200 includes a firing barrel 210 of a shooting device (e.g., tank cannon, gun, firearm) 220. The firing barrel 210 is coupled to a recoiling absorbing mechanism 230. The recoiling absorbing mechanism 230 is coupled to a base 240 (e.g., tank body, gun handle, gun butt, gun stock, gun grip, magazine/catch, gun base, turret base, carriage, mounting system). The recoiling absorbing mechanism 230 includes a three dimensional servo system 250, which is similar to the three dimensional servo 10 shown in FIGS. 1-8 and described above, which is incorporated herein.

During fire of shooting device 220, a recoil or “kick” is given by shooting device 220. The forward momentum of the bullet or other object shot from the shooting device 220 causes a backward momentum (see two top arrows directed left) that exactly balances the forward momentum of the bullet. The backward momentum is imparted to ball 260 of three dimensional servo system 250. Although referred to as ball 260, ball 260 may be spherical or have another three-dimensional curvilinear shape. The electromagnets of a socket 270 of the three dimensional servo system 250 may be controlled (e.g., computer controlled, electronically controlled, and/or mechanically controlled) by controller CU to provide force feedback (see bottom arrow directed to fight) to absorb the backward momentum of the recoil.

In shoulder supported shooting devices, the recoil absorbing system 200 reduces the recoil to less than 60 psi. The recoil absorbing system 200 may be configured to allow the shooting device 220 to be fired in any direction (e.g., downward for downward trajectory, laterally, upward).

Thus, the recoil absorbing system 200 reduces or neutralizes the recoil transmitted to the base 240 (e.g., tank body, gun handle, gun butt, gun stock, gun grip, magazine/catch, gun base, turret base, carriage, mounting system) of a shooting device 220.

Figure 13:
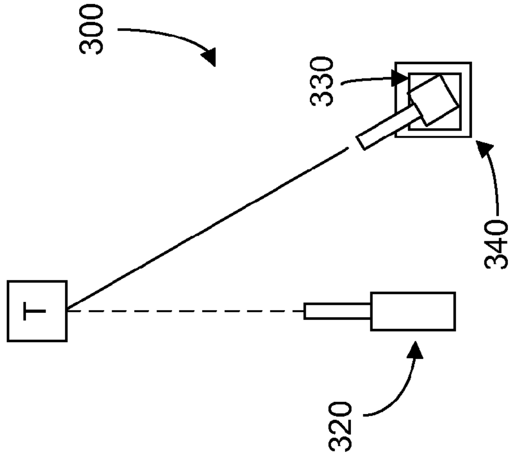
FIG. 13 is a simplified top plan view of an embodiment of a targeting system.

With reference to FIG. 13, an embodiment of a targeting system 300 will be described. The targeting system 300 includes a shooting device 320 that shoots an object (e.g., bullet) at a target T and a decoy/targeting device 330 that directs a laser at the target T to assist the shooter in hitting the target T and also providing a decoy for anyone trying to shoot at the shooter of the shooting device 320 since anyone trying to shoot at the shooter will follow the path of the laser and will shoot at the decoy/targeting device 330 instead of the shooter.

In an embodiment of the targeting system 300, the shooting device 320 directs an infrared signal at the target T. The infrared signal is not visibly apparent to anyone who may try to be shooting at the shooter of the shooting device 320. The decoy/targeting device 330 senses the infrared signal on the target T and directs a laser onto the target T to give the shooter visual confirmation to the shooter that the shooter is aimed to hit the target T with the shooting device 320.

Alternatively or additionally, one or more computers may determine via one or more sensors one or more of the location/position, relative distance between one or more of the target T, the shooting device 320, and/or the decoy/targeting device 330, and relative angle/direction of shooting device 320 and/or decoy/targeting device 330 to control where the decoy/targeting device 330 directs the laser based on the shooting device 320. In another embodiment, the shooting device 320 and the decoy/targeting device including wireless communication mechanisms for wireless communication with each other to accomplish one of more of the functions described herein.

One or more of the shooting device 320 and the decoy/targeting device 330 includes a three dimensional servo positioning system 340, which is similar to the three dimensional servo positioning 10 shown in FIGS. 1-8 and described above, which is incorporated herein. The three dimensional servo positioning system 340 controls/moves, for example, the direction of the laser from the decoy/targeting device 330.

Thus, the targeting system 300 assists the shooter by directing a laser from the decoy/targeting device 330 so that the aim at the target T with the shooting device 320 is visually confirmed target, and by providing a decoy for anyone trying to shoot at the shooter of the shooting device 320 because anyone trying to shoot at the shooter of the shooting device will follow the path of the laser back to the decoy/targeting device 330, shooting at the decoy/targeting device 330 instead of the shooter.

Figure 14:
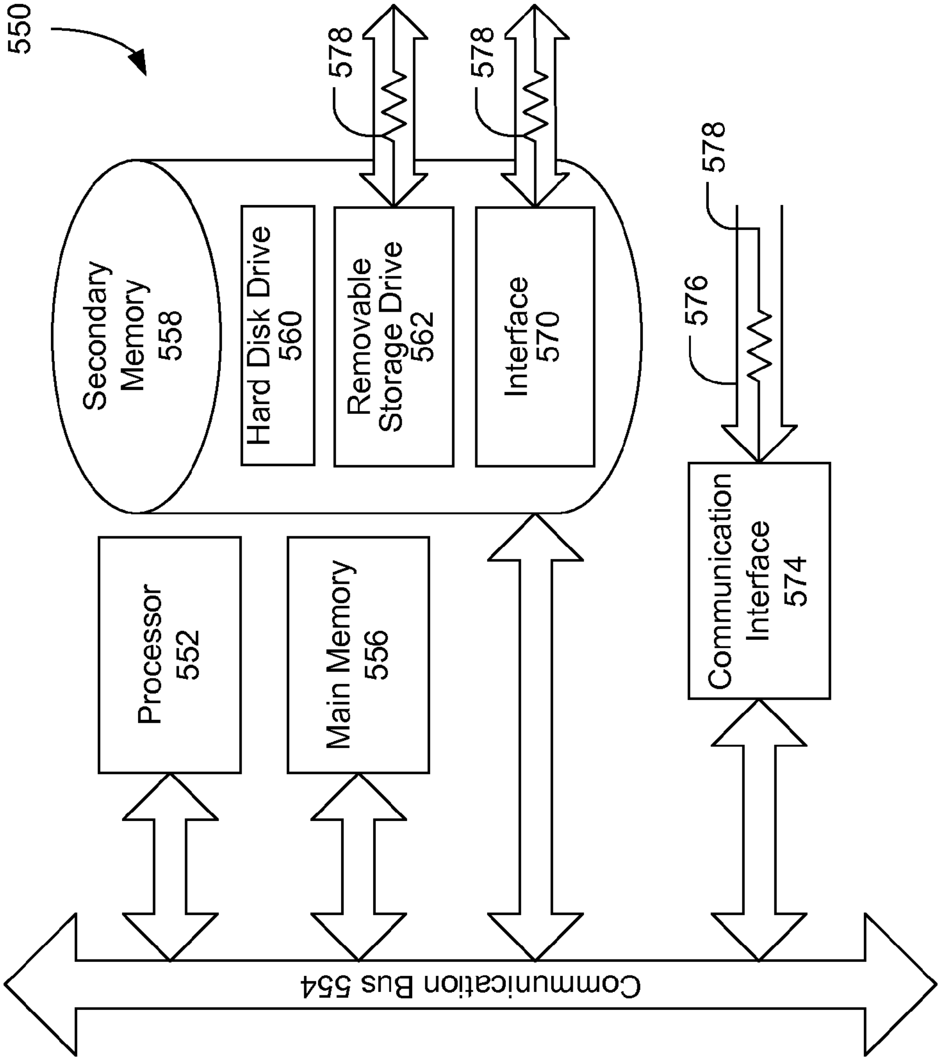
FIG. 14 is a block diagram illustrating an example computer system that may be used in connection with various embodiments described herein.

FIG. 14 is a block diagram illustrating an example computer system 550 that may be used in connection with various embodiments described herein. For example, the computer system 550 may be used in conjunction with one or more of the microcomputer(s), computer(s), and/or controller(s) described herein. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in any following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

I claim:

1. A 3-D servo positioning system for positioning a device, comprising:

- a part-spherical socket member having an outer surface and an inner surface;
- a housing containing the socket member;
- a ball rotatably engaged in the socket member;
- a plurality of bores passing from the outer surface of the socket member toward the inner surface thereof;
- a plurality of electromagnets positioned within the bores in the socket member;
- one or more magnets mounted in an end portion of the ball located in the socket;
- a shaft extending from a part of the ball outside the socket, wherein the shaft is for receiving the device and wherein the device is mounted to an end of the shaft;
- at least one Peltier junction inside the housing; and
- a controller programmed to actuate selected electromagnets based on sensor inputs so as to move the ball in the socket and adjust the angle and direction of the device attached to the shaft.

2. The 3-D servo positioning system of claim 1, wherein the ball comprises an embedded central magnet and four embedded peripheral magnets, the four peripheral magnets arranged in a square-like pattern centered around the central magnet.

3. The 3-D servo positioning system of claim 2, wherein the magnets each comprise an outer end near a surface of the ball, and wherein the four peripheral magnets have the same polarity at their outer ends and the central magnet has a polarity at its outer end that is opposite to the polarity of the outer ends of the four peripheral magnets.

4. The 3-D servo positioning system of claim 1, wherein the plurality of bores terminate short of the inner surface of the socket member.

5. The 3-D servo positioning system of claim 1, wherein the plurality of electromagnets comprise:

- a central electromagnet located near a center point of the part-spherical socket member;
- a plurality of peripheral electromagnets arranged in one or more circular patterns centered around the central electromagnet.

6. The 3-D servo positioning system of claim 1, wherein at least one electromagnet comprises:

- an outer cap having a diameter that is greater than a diameter of the electromagnet's respective bore;
- a shoulder;
- a winding shaft portion located between the outer cap and the shoulder; and
- a coil wound around the winding shaft portion.

7. The 3-D servo positioning system of claim 1, wherein:

- the device mounted to the end of the shaft comprises a solar panel having a central axis normal to the solar panel and
- the controller is further programmed to:
  - actuate selected electromagnets to continuously change a facing direction of the solar panel to locate a direction of optimal light intensity; and
  - actuate selected electromagnets to continuously rotate the solar panel about its central axis.

8. The 3-D servo positioning system of claim 1, further comprising electromagnetic shielding on an electronic component.

9. The 3-D servo positioning system of claim 1, further comprising at least one Hall effect sensor adapted to provide data to the controller, wherein the data are related to an orientation of the ball relative to the socket member.

10. The 3-D servo positioning system of claim 1, further comprising:

- multiple radio-frequency identification tags embedded within the ball and
- at least one radio-frequency identification reader on the socket member;
- wherein the controller is further programmed to receive data related to an orientation of the ball relative to the socket member from the radio-frequency identification reader.

11. The 3-D servo positioning system of claim 1, wherein the controller is further programmed to selectively actuate selected electromagnets so as to maintain the ball in a selected position at a selected torque and hold force.

12. The 3-D servo positioning system of claim 1, further comprising a global positioning system device, wherein the controller is further programmed to:

- receive positional data from the global positioning system device; and
- actuate selected electromagnets in response to the positional data received from the global positioning system device so as to move the ball in the socket and thereby direct the device to point toward a selected target.

13. The 3-D servo positioning system of claim 1, further comprising a targeting laser.

14. A 3-D servo targeting system, comprising:

- a part-spherical socket member having an outer surface and an inner surface;
- a ball rotatably engaged in the socket member;

a plurality of bores passing from the outer surface of the socket member toward the inner surface thereof;

a plurality of electromagnets positioned within the bores in the socket member;

one or more magnets mounted in an end portion of the ball located in the socket;

a first accelerometer and a first digital compass; and a controller programmed to actuate selected electromagnets based on sensor inputs so as to move the ball in the socket and adjust the position and orientation of the ball; wherein:

the socket member is mounted on a vehicle body;

a second accelerometer and a second digital compass are mounted to the vehicle body; and the controller is programmed to:

receive positional data from the first and second accelerometers and first and second compasses;

ascertain a previous position of a target based in part on the positional data received from the first and second accelerometers and first and second compasses; and actuate selected electromagnets so as to move the ball in the socket and thereby direct an object mounted to the ball to point toward the previous position of the target.

15. The 3-D servo targeting system of claim 14, further comprising a targeting laser.

16. The 3-D servo targeting system of claim 14, further comprising:

at least one Peltier junction and at least one temperature sensor.

17. The 3-D servo targeting system of claim 14, further comprising electromagnetic shielding on an electronic component.

18. The 3-D servo targeting system of claim 14, further comprising at least one Hall effect sensor adapted to provide data to the controller, wherein the data are related to an orientation of the ball relative to the socket member.

19. The 3-D servo targeting system of claim 14, further comprising:

multiple radio-frequency identification tags embedded within the ball and at least one radio-frequency identification reader on the socket member;

wherein the controller is adapted to receive data related to an orientation of the ball relative to the socket member from the radio-frequency identification reader.

20. The 3-D servo targeting system of claim 14, wherein:

a shooting device is mounted on the ball and the controller is programmed to actuate selected electromagnets to provide force feedback to absorb a portion of backward momentum recoil created by the shooting device.

* * * * *